US012731359B2

(12) United States Patent
Beyl et al.

(10) Patent No.: US 12,731,359 B2
(45) Date of Patent: Sep. 8, 2026

(54) INTELLIGENT CAMERA ILLUMINATION AND PROJECTOR

(71) Applicant: B. Braun New Ventures GmbH, Freiburg Im Breisgau (DE)

(72) Inventors: Tim Beyl, Baden-Baden (DE); Robert Jakob, Ihringe (DE)

(73) Assignee: B. Braun New Ventures GmbH, Freiburg im Breisgau (DE)

( * ) Notice: Subject to any disclaimer, the term of this patent is extended or adjusted under 35 U.S.C. 154(b) by 509 days.

(21) Appl. No.: 18/109,986

(22) Filed: Feb. 15, 2023

(65) Prior Publication Data

US 2023/0267698 A1 Aug. 24, 2023

(30) Foreign Application Priority Data

Feb. 18, 2022 (DE) .................... 10 2022 103 885.8

(51) Int. Cl.
*G06V 10/143* (2022.01)
*G06T 7/50* (2017.01)
(Continued)

(52) U.S. Cl.
CPC .............. *G06V 10/143* (2022.01); *G06T 7/50* (2017.01); *G06T 15/00* (2013.01); *H04N 23/11* (2023.01);
(Continued)

(58) Field of Classification Search
CPC ......... G06V 10/143; G06T 7/50; G06T 15/00; G06T 2207/10056; G06T 2207/10152;
(Continued)

(56) References Cited

U.S. PATENT DOCUMENTS 7,330,749 B1 * 2/2008 Bhunachet ........... A61B 5/0071 600/478
10,390,906 B2 8/2019 Hackel
(Continued)

FOREIGN PATENT DOCUMENTS

DE 102005021808 A1 11/2006
DE 102017216852 A1 3/2019
EP 2932932 B1 3/2019

OTHER PUBLICATIONS

DE 102005021808 translation (Year: 2006).*
Search Report received in German Application No. 10 2022 103 885.8 dated Nov. 21, 2022, with translation, 10 pages.

*Primary Examiner* — Sinh Tran
*Assistant Examiner* — Angel L Garces-Rivera
(74) *Attorney, Agent, or Firm* — Christopher A. Rothe; CM Law

(57) ABSTRACT

An imaging system, medical microscope, surgical light, robotic system, imaging method, and computer-readable storage medium. The imaging system creates an optimized image of a region to be imaged and includes an irradiation system. The irradiation system has at least a first and a second individually adjustable radiation emitter for individual irradiation of the region to be imaged. A camera system includes at least one camera that creates an image of the region to be imaged. An image analysis unit is adapted to analyze the image and digitally provide an analysis result. A control unit is adapted to control the irradiation system based on the analysis result and change an irradiation of the first and/or second radiation emitter in an intensity of the radiation and/or in a wavelength of the radiation to achieve an optimized irradiation for the image.

20 Claims, 2 Drawing Sheets

(51) Int. Cl.
*G06T 15/00* (2011.01)
*H04N 23/11* (2023.01)

(52) U.S. Cl.
CPC ............... *G06T 2207/10056* (2013.01); *G06T 2207/10152* (2013.01)

(58) Field of Classification Search
CPC .............. H04N 23/11; A61B 2090/309; A61B 2090/371; A61B 90/30; G02B 21/0012; G02B 21/06
See application file for complete search history.

(56) References Cited

U.S. PATENT DOCUMENTS

| | | | | |
|---|---|---|---|---|
| 10,682,186 | B2 | 6/2020 | Saur et al. | |
| 2018/0008135 | A1* | 1/2018 | Robertson | A61B 1/07 |
| 2020/0318810 | A1* | 10/2020 | Tesar | G02B 6/0006 |
| 2021/0298863 | A1 | 9/2021 | Coskun | |

* cited by examiner

INTELLIGENT CAMERA ILLUMINATION AND PROJECTOR

CROSS-REFERENCE TO RELATED APPLICATION

This application claims priority under 35 U.S.C. § 119 to German Application No. 10 2022 103 885.8, filed on Feb. 18, 2022, the content of which is incorporated by reference herein in its entirety.

FIELD

The present disclosure relates to an imaging system for an optimized image, in particular in the field of medical technology, with which in particular a digital optimized image of an operation area, in particular of a situs, can be created. In addition, the present disclosure relates to a medical microscope, a surgical light, an, in particular medical, robotic system, a medical imaging method and a computer-readable storage medium.

BACKGROUND

Optical cameras, regardless of whether they are digital or analog, require a light source that emits light beams onto the surface to be captured or respectively to be imaged (as a region to be imaged), which are reflected on the surface to be captured and hit a film or sensor where they create an image (picture) on the film or sensor. This light source may be natural light, i.e. light from the sun, or artificially generated light produced by various techniques such as a light bulb or a light-emitting diode (LED).

According to the current prior art, a camera or camera system can be combined with an artificial lighting system to form an imaging system in order to create the best possible images of an image region. Such imaging systems are used in industry, for example, where an artificial light source is used for illumination of regions or surfaces to be captured, respectively, of which an image is to be taken. Imaging systems with illumination and camera are also used in microscopy (for example in surgical microscopes) or in endoscopy.

A radiation direction/irradiation direction of the used light can come from the opposite direction of the camera, from the same direction as the camera or from the sides, which results in different illumination scenarios and illumination modalities. The same illumination techniques can also be used for moving images/video recordings or for serial images of pictures.

However, current combinations of illumination and camera, in particular in medical technology, have the major disadvantage that an illumination can only be set very roughly and widely, which makes exposure of the sensor and homogeneity of the illumination problematic. A high dynamic range of the light source and the corresponding reflected radiation leads to the cutting off of (image) information at the sensor, when the sensor can no longer capture or detect such a dynamic range. In addition, this image is difficult to interpret by a medical professional, such as a surgeon, since overexposed and underexposed regions are created, making it more difficult to graphically display the important information. The image (or respectively the captured picture) can usually only be optimized globally, which entails high deficiencies with respect to large, different regions of the image. A typical problem in illumination of objects for imaging is a lack of homogeneity of the resulting image. A strongly varying illumination intensity incident on the sensor results in a lack of homogeneity of the image, in particular with respect to an exposure information and a fine gradation of colors.

Although there are attempts in the prior art to improve the homogeneity of the image, for example by using a combination of several light sources, this has the disadvantage of creating a complex lighting system and also of taking up a large volume in a room, in particular an operating room. Furthermore, it is still not possible to achieve the desired precision of illumination and an improved image.

Furthermore, there are imaging systems with combinations of cameras and illuminations, which create several pictures or images with different illumination conditions and calculate a so-called high dynamic range picture (HDR picture), which is composed of the pictures taken with different illumination conditions. However, this post processing has the disadvantage that in the case where objects are moving, the combination of several images into a single image becomes particularly difficult, since the position of the objects in the images is constantly changing. Furthermore, there is the problem that if a digital video/video stream is to be generated from the image, sensors with lower speed cannot be used.

SUMMARY

It is therefore the object and goals of the present disclosure to avoid or at least reduce the disadvantages of the prior art and in particular to provide an imaging system, a medical microscope, a surgical light, a robotic system, a medical imaging method, a use, and a computer-readable storage medium, with which an adapted irradiation of a surface to be captured or of a region to be imaged/image regions is achieved, and an even better, more precise and directly understandable image with even more information is obtained.

The objects of the present disclosure are solved by a generic imaging system, a medical microscope, a generic surgical light, a medical robot system, a use, an imaging method, and a computer-readable storage medium as described herein.

Thus, a basic idea of the present disclosure is to provide an intelligent irradiation system, in particular lighting system, and camera system/sensor system/detector system that improves image/picture generation by selectively changing and adapting irradiation, in particular illumination. This disclosure thus describes the use of an irradiation system, in particular lighting system, in connection with a camera or a camera system with a camera, wherein the irradiation system can selectively irradiate, in particular illuminate, the scene detected by the camera, that is, an intensity or brightness and/or a wavelength of the radiation, in particular light, can be individually controlled for each part of the illuminated scene of the image region.

The imaging system comprises a camera system with at least one camera, an image analysis unit and an irradiation system, in particular a lighting system, which is driven/controlled on the basis of the image analysis unit (by the image analysis unit itself or by a control unit) in such a way that the illumination is adapted in order to adapt the irradiation, in particular the illumination of the scene, locally or globally and to improve the captured image. In particular, target parameters may be predefined for the control unit, to which the control unit is to adapt the lighting system and thus the image. Preferably, a target parameter is the homogeneous exposure and/or a homogeneous contrast and/or a recognition of an object and an adapted illumination of this object compared to its environment. This imaging system helps in particular to avoid underexposure and overexposure, since overexposed or underexposed parts of the scene can be identified with the aid of image analysis or respectively image processing, and the irradiation system, in particular the lighting system, can then be adapted so that the underexposed or overexposed parts of the image (picture) are adapted and correctly exposed. An intensity of irradiation, in particular illumination, in the overexposed part of the image is reduced, whereas an intensity of irradiation in the underexposed part is increased. The imaging system can therefore be used to selectively individualize and adapt the irradiation, in particular illumination, and thus optimize the image locally.

Compared to the prior art, this allows in particular a lower total light intensity to be used, since longer exposure times are possible.

The creation of the image (picture) using the intelligent imaging system (lighting system with camera system) has several advantages over the conventional approach. For example, if the first image does not have to be optimal immediately (no time-critical/time-relevant applications), but can be improved over time, the following steps may preferably be performed or respectively the control unit may have the following configuration in order to create optimal exposure conditions. In particular, multiple images of the scene or respectively of the image region may be taken, wherein an image analysis (image processing) is used to analyze each individual image and to optimize the intensity for each light beam until an optimal illumination is achieved to produce an optimal image (iterative process). For this purpose, metrics and scales as well as global and local quality metrics can be provided or respectively stored to the image processing algorithms, such as targeting or target adaptation of a normalized histogram with changing illumination. Furthermore, internal parameters of the camera, such as illumination or exposure time (exposure) or light sensitivity (ISO value), can be changed together with the illumination of the lighting system in order to further optimize the image. Thus, parameters on the irradiation system side as well as on the camera system side can be adapted for an optimal image. This iterative approach means that the image/picture is improved over time, since the changes are incremental. Also, changes in the image region may require adaptation of the illumination and/or camera parameters. Alternatively or respectively, a selectively controllable filter may be provided together with (and after) a radiation source as a radiation emitter (alternatively, a selectively controllable filter may be additionally used in front of the sensor), where each pixel transmission configuration or respectively a degree of transmission of the radiation, in particular of the light, may be individually changed for each pixel (on the side of the alternatively additional filter in front of the sensor, a parameterization of a pixel readout configuration may be set). For example, controllable liquid crystals (as a grid-shaped arrangement of pixels) arranged in matrix-shape can change the polarization of light to thereby change a transparency and thus a degree of transmission. Each individual liquid crystal with an upstream radiation source (e.g. one radiation source for all liquid crystals or a separate radiation source for each) can be regarded as a radiation emitter.

In other words, an imaging system for creating an optimized image of a region to be imaged is disclosed, comprising: an irradiation system, in particular a lighting system in the region of visible light, comprising at least a first and a second individually adjustable and controllable radiation emitter for individual irradiation of different parts/regions of the region to be imaged; a camera system comprising at least one camera, which creates an image of the region to be imaged, for example a picture or a video recording; an image analysis unit adapted to analyze the image of the camera system, in particular with respect to underexposure and overexposure, and to provide it digitally as an analysis result (for example as a matrix of the image with entries for the exposure, in particular with matrix entries for regions or for each pixel of the image), and a control unit adapted to drive/control the irradiation system, in particular the lighting system, on the basis of the analysis result and to change an irradiation of the first and/or second radiation emitter in an intensity of the radiation and/or in a wavelength of the radiation in order to achieve an optimized irradiation for the image, in particular to achieve an image with homogeneous illumination intensity and detection intensity. Thus, an actual state of the image is analyzed, compared with a target state, and the control unit controls the at least first and second radiation emitter in such a way that the irradiation, in particular illumination, and thus the image changes to (or, in the case of iterative adaptations, at least towards) the target state. The term homogeneous detection intensity means in particular that the sensor has an intensity of a detection of the radiation of different wavelengths that is as homogeneous as possible over its sensor area, and in particular a detected maximum intensity tends to be relatively low compared to a detected minimum intensity or, respectively, diverges as far as possible only to such an extent that the sensor can detect the radiation information in its gradation as accurately as possible without having to cut off information in order not to obtain underexposed or overexposed regions. In other words, a gradation of the detected wavelength (between a minimum wavelength value and a maximum wavelength value) as accurately as possible and a certain gradation of the intensity (between a minimum intensity and a maximum intensity) should be achieved to enable a homogeneous and thus accurate and information-rich detection. If, for example, the sensor of the camera system is set to a light sensitivity (in advance), this light sensitivity should be sufficient to detect both the minimum intensity and the maximum intensity, which is or respectively gets adapted by the lighting system accordingly so as not to cut off any information. One could also say that a control circuit is implemented, in which the lighting system is controlled or regulated according to the value detected by the camera system (e.g. the exposure intensity of a region). In this case, it is not necessarily a pixel of the sensor that is to be used as the control variable, but rather, for example, a predefined region of the sensor as the analysis area, so that this region has a radiation intensity that is as homogeneous as possible and deviates as little as possible from other regions of the sensor. Thus, in a first sensor region, such a mean radiant intensity could be required, so to speak, which is substantially equal to a mean radiant intensity of a second sensor region. In particular, the sensor area of a sensor of the camera system may be divided into an analysis region with several sensor portions or sensor-regions, wherein these sensor-regions should have an average intensity as equal as possible, in order to avoid underexposed and overexposed regions.

The term 'image' in this context means that a two-dimensional or three-dimensional picture is created, statically similar to a photo, or dynamically similar to a video.

The term 'radiation emitter' means in the present context a unit or a system which has a radiation source and emits radiation. This may be, for example, a single controllable radiation source as well as a system of a radiation source and a downstream controllable filter.

According to one embodiment, the imaging system, in particular the irradiation system, may comprise a filter controllable by the control unit and adapted to controllably selectively lower an intensity of a radiation and/or to filter at least one wavelength or wavelength range in order to serve as a radiation emitter together with an upstream radiation source.

According to a further embodiment, the filter may be adapted to set a different absorption of a radiation at at least two different portions through which the radiation passes, so that an intensity of the radiation is locally selectively adjustable. In particular, a filter can be placed in front of each individual light source. In addition, one or more filters may preferably be placed in front of each sensor.

Preferably, the lighting system may comprise a projector/projection device having a grid-shaped or matrix-shaped arrangement of individually controllable radiation emitters, in particular a liquid crystal display (LCD) or a digital light processing (DLP) or as a laser projector (laser with mirror) or as a liquid crystal on silicon (LCoS) projector or as an array with several individually controllable LEDs, so that a projected illumination with individually controllable radiations, in particular light beams, is provided for different regions of the region to be imaged. In other words, the lighting system may have individually controllable irradiation sources, in particular light sources, and/or dim the light using a selective filter or filter arrangement such as an LCD or DLP system. This results in one selectively dimmed light beam per controllable element (pixel for LCD, mirror for DLP). In addition, each light beam can be individually controlled in wavelength. In particular, selectively controllable filters (DLP, LCD) may also be used in the light path towards/of the sensor, i.e. the reflected light can be controlled to pass through one or more of these filters before hitting one or more sensors of the camera system. In particular, a selectively controllable filter may also be used in the common beam path/combined light path of one or more sensors and radiation emitters. Alternatively or in addition to a selectively controllable filter in front of the light source, a controllable light source or several controllable light sources may be used as radiation emitter, where each light beam is directly controllable in its intensity (e.g. laser via mirror, or individually controllable LEDs).

In particular, the lighting system may comprise at least a first and a second projector, wherein the first projector as a first controllable radiation emitter emits a first wavelength, in particular with different (individually set) intensities on the projection surface of the projector, and the second projector as a second controllable radiation emitter emits a second wavelength. The imaging system may also be used to illuminate different parts of the scene/image region with different wavelengths or to illuminate different parts of the scene with multiple wavelengths. This can be done either by an optical system that guides both projectors as radiation emitters of the lighting system through the same optical path, or multiple projectors with different wavelengths can be used. The radiation of the irradiation system does not necessarily have to be in the visible spectrum, but may be in the IR region and/or the UV range and/or the X-ray range. In particular combinations or several light sources are possible. The lighting system and the camera system/sensor system may be independent of each other and use independent optical radiation paths, but they may also share optical paths, at least in sections, so that emitted light and reflected light run parallel in the common optical path.

According to one embodiment, the first projector may use wavelengths in the IR range or UV range or X-ray range and emit radiation in that wavelength range to cause fluorescence, and the second projector may use wavelengths in the visible range, in particular white light, in order to provide the surgeon with an adapted illumination of the region to be imaged. This provides a white light environment and fluorescence environment, so to speak. In a surgical environment, in particular, different lighting systems and/or filters and/or sensors may be combined in order to provide white light imaging in combination with fluorescence imaging by selectively illuminating portions of the scene with IR/UV light and selectively illuminating portions of the scene with white light. In particular, the white light may be incident on an LCD filter, preferably multiple LCD filters.

According to a further embodiment, the control unit may be adapted to control the lighting system such that a provided, in particular colored, picture is projected via the lighting system directly into the region to be imaged in order to act as an augmented reality projector, and the control unit is preferably adapted to detect an input movement of the user via the camera system and to interpret it as a control signal. In other words, the lighting system can be used as an augmented reality projector in order to project images directly into the scene and interact with the human operator. In this case, the control unit and projector can be adapted to display information to the user in the entire illuminated image region or in one or more subregions of the projected image, while other subregions are used to optimize the lighting conditions for the camera.

In particular, the at least one camera may have a sensor with a matrix-shaped arrangement of semiconductor sensor points (pixels) for radiation measurement, in particular light measurement, preferably a CMOS sensor, wherein a beam path from the radiation sources to the sensor and an assignment of radiation source to sensor pixel is predefined, so that for an adaptation of an individual pixel exactly the associated radiation source is adapted. An illumination and thus an image quality is to be improved with time and in addition, one can use the advantage that it is predetermined, which beam of the radiation emitter acts on which pixel of the sensor. For this, an arrangement of the lighting system or respectively of the illumination relative to the camera system or respectively the corresponding camera has to be known. Also, a distance between the origin of each light beam and the point where it hits an object has to be known. With this information, the control unit can calculate which beam from the camera and which beam from the object to the camera sensor intersect. This information can be used by the control unit to adapt the illumination to the requirements of the sensor to produce an optimal picture by adjusting the intensity of each beam to a value at which the sensor and the image processing unit can produce an optimal picture. Here, the assignment to a beam from the lighting system and the match to the illuminated pixel of the sensor is known in advance. This information can be used to directly determine the radiation emitter that has to be changed to alter the intensity and/or wavelength of the light reaching the image sensor.

In order to implement this approach, for example, the geometry between the projector of the irradiation system and the camera can be determined (e.g. by calibration) and the intersection point between the beams and the objects in the field of view can be found. This intersection point may be determined either by the camera provided in the imaging system (for example by using the projector as a structured light projector and measuring the 3D position of each object) or by an external 3D measurement system registered with respect to the camera and/or the projector of the irradiation system.

According to a yet further embodiment, the control unit may be adapted to iteratively perform the process of imaging, analyzing, and adapting the irradiation to obtain an optimized irradiation and thus an optimized image.

According to a further embodiment, the control unit may be adapted to divide the image into subregions, in particular sensor regions (preferably to define a mean radiant intensity for the subregions of the image) and to control the lighting system in such a way that the subregions have the same mean radiant intensity or have a mean radiant intensity whose maximum value differs from the minimum value by at most 20%, in particular by at most 10%. Furthermore, the control unit may preferably be adapted to detect an object, for example a tissue, in the image via image analysis and to define this object as a subregion.

According to one embodiment, the camera system may comprise a 3D camera in order to create an image with depth information. The imaging system may also use one or more 3D cameras for the camera system.

In particular, an optimal picture is to be generated without having to adapt the illumination with respect to time. For this purpose, the camera(s) and the projector may be registered geometrically with respect to each other, similar to the previous approach with pixel-precise association. The image region/scene either has to be modeled so that it is known in advance, or it has to be detected in real time so that the optimal illumination settings are known in advance. In order to create optimal lighting conditions, the intersection of all beams with the observed objects has to be determined and the normals for these points and material parameters of the surfaces (e.g. reflectivity) and optimal models of the camera and of the sensor have to be determined. Using image processing, this information can be used to determine the wavelength and intensity for each beam in advance. However, since optimal models and measurements are required, this approach is fraught with challenges. A hardware setup in a static scenario, where the projector and the camera do not move with respect to each other, is comparable to structured light cameras, where a known projected pattern is used to illuminate the scene and a 2D camera observes the distorted pattern. Via image processing, a 3D image is generated from the known geometry between projector and camera as well as the measured distorted image. Compared to this approach, the present approach does not use illumination to project a pattern to measure 3D information, but to create optimal illumination conditions for the camera.

In particular, the geometry between the camera and the lighting system may also change over time, leading to an increased effort of analysis in order to calculate the correct light intensity for each beam. In particular, the imaging system may have a configuration such that the geometry of the sensor or sensors and of the projector or projectors is not rigid, but can be adapted and changed during ongoing use.

According to one embodiment, the imaging system may comprise a prism, in particular two deflection prisms, in order to realize a common beam path of irradiation system, in particular lighting system, and camera system. In particular, if two emitters are used, the prisms may also be used for a combination of their beam paths. Furthermore, filters may preferably be used before or after the prisms.

According to a further embodiment, the camera system may comprise at least two sensors that are differently sensitive to different wavelengths in order to combine the highest possible sensitivity for different ranges of wavelengths, wherein preferably the sensors are used on separate beam paths or on the same beam path. In particular, the sensors may be differently sensitive for different wavelengths in order to combine the advantages of different sensors and one or more light sources.

Preferably, multiple sensors may be used on the same or separate light paths.

According to one embodiment, selectively controllable filters may be used to switch the illumination parameters and sensor parameters between images. For example, different illumination situations can be created with a frequency that is not visible to the human eye. In particular, optimal illumination conditions can be created for the sensor in order to produce an optimal picture. Alternatively or additionally, the irradiation system, in particular the lighting system, may be adapted to be switched or combined between the images. In particular, the camera system (with the at least one sensor) and the lighting system as well as preferably further filters, can be synchronized so that switching between the images is possible.

With regard to a medical microscope, in particular a surgical microscope, the objects are solved in that it has the imaging system according to the present disclosure. It can also be said that in one embodiment the imaging system with the lighting system is part of a microscopic system and serves as a digital microscopic unit with adjustable illumination.

With regard to a surgical light, the objects are also solved in that it comprises the imaging system according to the present disclosure. In particular, the lighting system can be used independently of the camera system/sensor system, and the lighting system, preferably including the filters, can be used in order to create optimal lighting conditions for human operators (intelligent lamp or surgical light). This can be realized in particular in a medical operating light, which can selectively darken regions of the illuminated region in order to improve surgical visibility. The smart lamp or respectively smart lighting system can then preferably be controlled by selecting the region to be dimmed (such as manually by the operator through an input device such as a touch display) or by combining it with a sensor and an algorithmic system that automatically detects which regions have to be dimmed.

In particular, a robotic system may have such a medical smart lamp, or respectively the smart lamp may be attached to a robotic system that can change the position of the lighting system in order to improve illumination for a medical professional or an (image) sensor. In both cases, lighting system and camera system can be used together. If only a lighting system is used together with the human, a sensor system with an algorithm can be used in order to track one or more regions of interest for which the optimal lighting conditions are to be created.

With regard to a medical, preferably surgical, robot system, in particular with two robots, the objects are solved in that at least one robot has the imaging system according to the present disclosure and guides it for an image on the robot arm.

In particular, a robot has an imaging system according to the present disclosure or holds a couplable assembly of the imaging system. Thus, in particular, the entire assembly of the imaging system may be held by a robot. In one version of the imaging system, in particular, parts of the assembly (camera system or lighting system) or the entire assembly of the imaging system may be mounted to a robot so that the size, position and orientation of the image region or of the illuminated region may be controlled.

In particular, multiple robots may be provided, wherein the robots may each guide a sensor and/or a projector of the lighting system. Preferably, in a scenario where the geometry between the camera system and the lighting system is adaptable, one or more robots may be used to hold one or more sensors or projectors and to adapt the geometry with them.

Moreover, the objects are solved with respect to a use that an imaging system according to the present disclosure is used in a medical microscope, in a surgical light, or in a robotic system with robots or in an endoscope.

The objects of the present disclosure are solved with respect to an imaging method for an optimized image of a region to be imaged, by the steps of: irradiating the region to be imaged with at least a first and a second individually adjustable radiation emitter; imaging the irradiated region to be imaged by a camera system comprising a camera; analyzing the image by an image analysis unit, in particular with respect to underexposure and overexposure; controlling, by a control unit, the at least first and second radiation emitter in order to change an irradiation of the first and second radiation emitter in an intensity of the radiation and/or in a wavelength of the radiation, and in order to achieve an optimized image.

With respect to a computer-readable storage medium, the objects are accomplished by comprising commands which, when executed by a computer, cause the computer to perform the method steps of the imaging method in accordance with the present disclosure.

Any disclosure relating to the imaging system of the present disclosure applies equally to the imaging method of the present disclosure, as well as vice versa.

BRIEF DESCRIPTION OF THE DRAWINGS

The present disclosure is explained in more detail below by way of preferred configuration examples with reference to the accompanying figures. The following is shown.

The figures are schematic in nature and are intended only for understanding the present disclosure. Identical elements are provided with the same reference signs. The features of the various embodiments may be interchanged.

DETAILED DESCRIPTION

Figure 1:
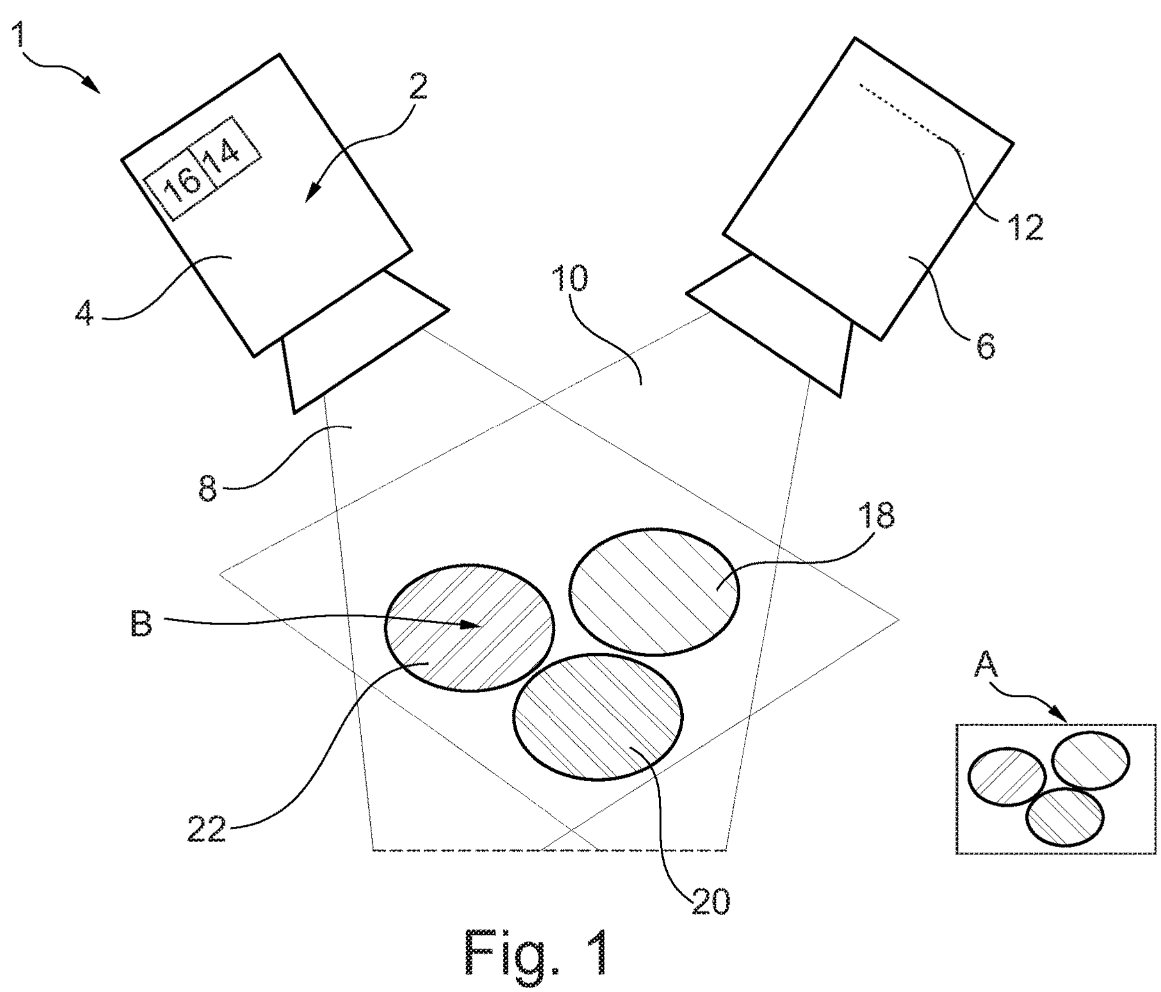
FIG. 1 shows a schematic perspective view of an imaging system according to a first preferred embodiment.

FIG. 1 shows, in order to explain the present disclosure and its principles, a schematic side view of an intelligent imaging system 1 according to a preferred embodiment. The imaging system 1 has a combined lighting and camera system with a camera system 2 in the form of a single camera 4 for an image A and a lighting system 6. A field of view 8 of the camera 4 is schematically shown and directed to an image region B or respectively to the surface to be captured. Likewise, an illumination field or an illumination cone (illuminable surface) 10 of the lighting system 6 is shown, which is also directed to the image region B. Thus, in this embodiment, there is a static relation between the camera system 2, the image region A, and the spaced lighting system 6. The lighting system 6 and the camera system 4 are in a sense independent of each other and use different optical paths.

The irradiation system 6 comprises a projector in the form of an LCD projector, in which a projected image can be generated within the resolution area of the projector. In particular, the present projector has a resolution of 20*10 pixels, so that two hundred separate, individually controllable light beams with different wavelengths and different intensities can be irradiated into the illumination field 10 of the projector. It can also be said that the irradiation system 6 with the projector has two hundred individually controllable radiation emitters 12.

The imaging system 1 furthermore comprises an image analysis unit 14, which is adapted to analyze the digital image A of the camera system 2 with respect to underexposure and an overexposure and to provide it as an analysis result digitally to a control unit 16. This control unit 16 of the imaging system 1 is in turn specially adapted to control the lighting system 6 on the basis of the analysis result with the regions of overexposure and underexposure and to change and adapt an illumination of the two hundred individually controllable radiation emitters 12 in each case in an intensity of the radiation and further preferably in a wavelength of the radiation in order to obtain an optimized irradiation for the image A with a homogeneous illumination intensity and consequently a homogeneous detection intensity.

For illustration purposes, a first object 18, a second object 20 and a third object 22 are shown schematically in the image region B in FIG. 1. During a surgical procedure on a patient, these objects may represent different tissue areas, for example, that exhibit different colors and degrees of reflection, which pose a challenge for a corresponding image. The imaging system 1 can now illuminate each individual object in a targeted manner with an individually adjustable intensity. In particular, even if the objects move, for example during an operation, when an intracorporeal anatomy is moved relative to the imaging system, for example because a part of the patient's body is moved or because the imaging system 1 is moved and repositioned, the new tissue structure can be analyzed by the imaging system 1 and can be illuminated in the best possible way. Manual adjustment is not required and the best possible adapted modality of illumination of the image region B is automatically provided.

For this purpose, the lighting system 6, controlled by the control unit 14, can change the intensity of the light beam that hits the corresponding object in the illumination field in a targeted manner. If, as in the present case, a projector, such as an LCD projector, DLP projector or laser projector/projection device is used, a projected picture can be generated within the resolution area of the projector and can be projected into the illumination field of the projector. With a fixed geometry between camera and illumination, one or more beams of the lighting system intersect with an optical path of the camera sensor of the camera 4 onto the image region. Thus, when the imaging system 1 selectively adapts the intensity and preferably also the wavelength of the light reflected from an object, the intensity of the light reflected to the camera sensor changes on the beam going from the object to the camera sensor, resulting in a changed saturation of the camera sensor. Thus, adapted illumination conditions are generated, which are adapted to the observed scene or respectively to the image region and to the image sensor of the camera. An example of this is here the creation of an image without overexposed or underexposed regions. As indicated above, a partially underexposed or overexposed image may occur if the observed scene or respectively the image region B contains objects with a low degree of reflection and objects with a high degree of reflection. Using a simple lighting system according to prior art for all objects usually results in either overexposing the objects with high degree of reflection or underexposing the objects with low degree of reflection. With the intelligent imaging system 1 according to the present disclosure, the beams illuminating the overexposed parts can be attenuated and the beams illuminating the underexposed objects can be amplified and brightened, resulting in an (overall) image that captures all objects in the correct illumination.

Figure 2:
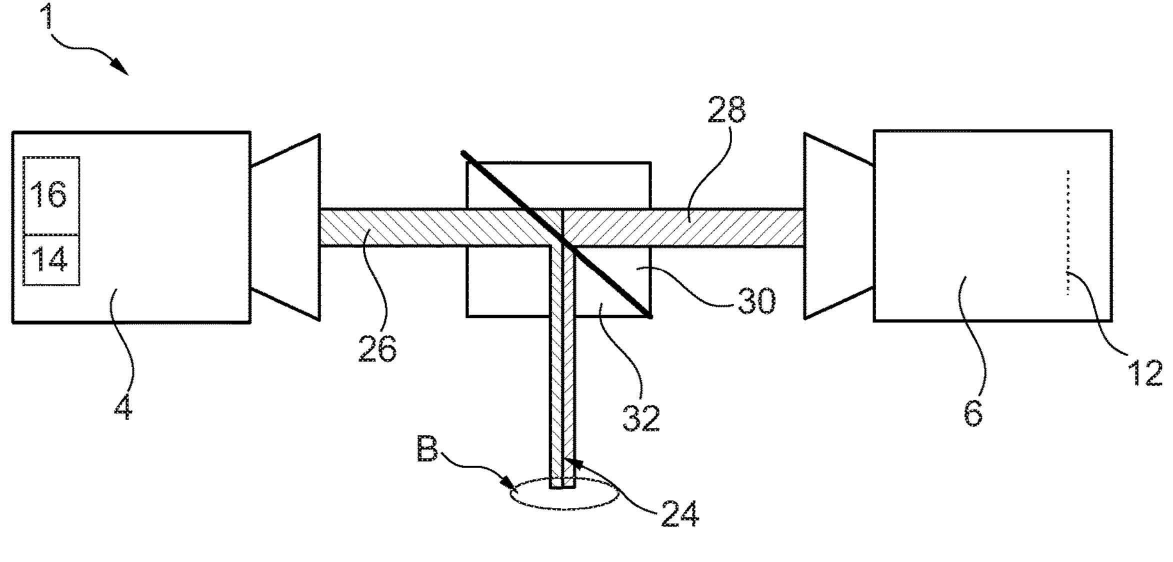
FIG. 2 shows a schematic front view of an imaging system according to a further, second preferred embodiment with a uniform beam path.

FIG. 2 shows a front view of an imaging system 1 according to a further, second preferred embodiment of the present disclosure. In contrast to the first embodiment of FIG. 1, the imaging system of FIG. 2 (partially) uses a common optical path 24 for both the lighting system 6 and the camera system 2. The emitted radiation of the lighting system 6 is irradiated in bundled form on the optical path 28 of the illumination onto a first deflecting prism 30 and is deflected onto the image region B. There, the radiation hits the surface to be captured having, for example, different tissue portions, is reflected, and is forwarded as an optical path to the camera 26. The optical path of the camera 26 is guided from the common optical path 24 to a second deflecting prism 32 which is opposite the first deflecting prism and which guides the beam path to the camera 4 and the camera sensor. Therefore, even in the case of spatially separated or respectively spaced lighting system and camera systems, an optical path of the radiation can be partially divided and the imaging system 1 can be even better adapted to, for example, an operation. In particular, such an imaging system can be easily integrated into a medical device, such as an endoscope or a surgical microscope. The optical system of the surgical microscope can simply be oriented to the intracorporeal tissue and the imaging system 1 creates a corresponding image A, which is specially adapted and particularly well illuminated.

Figures 3, 4:
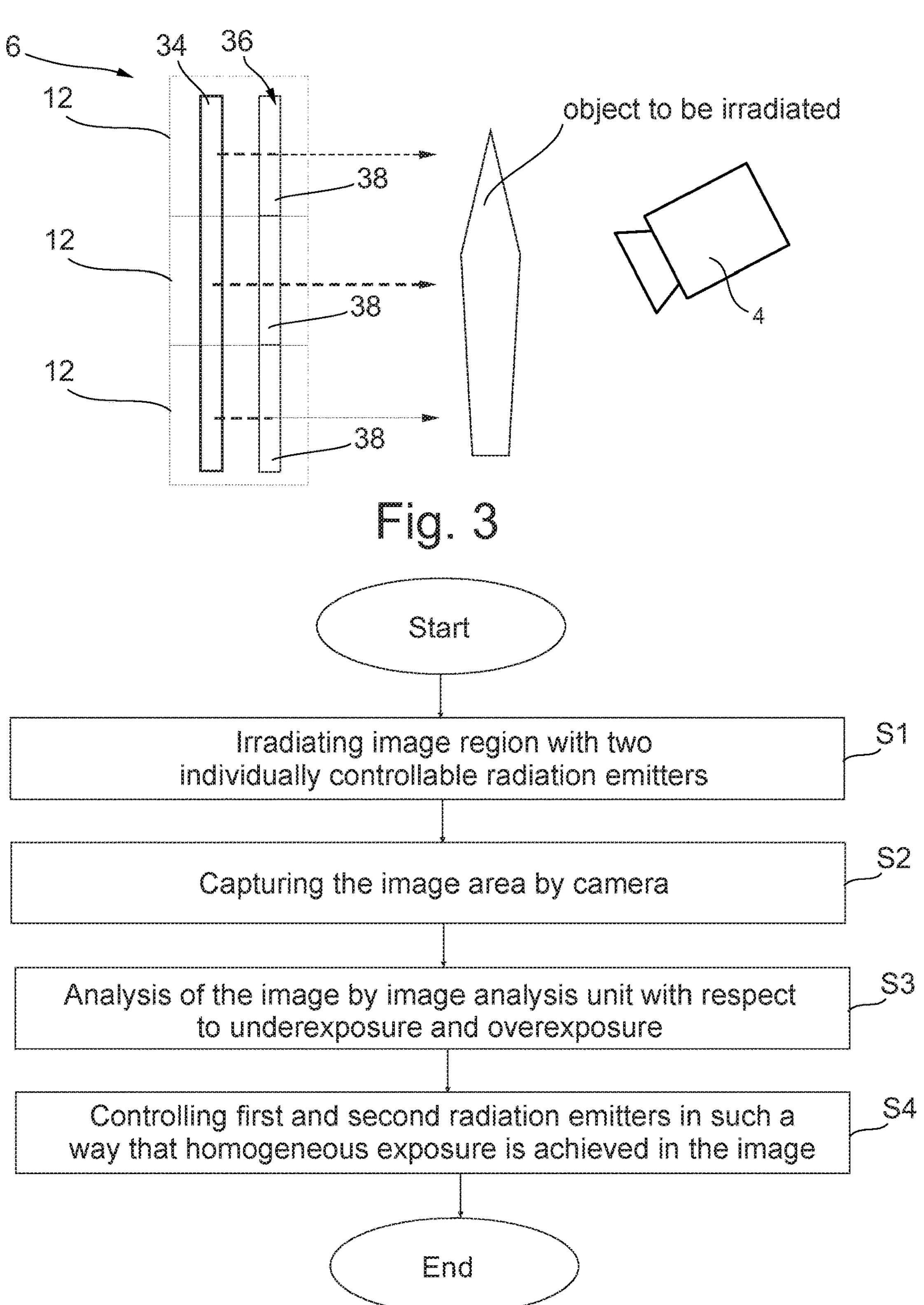
FIG. 3 shows a schematic view of a radiation emitter of the lighting system.
FIG. 4 shows a flow diagram of an imaging method according to a preferred embodiment of the present disclosure.

FIG. 3 shows in a schematic view examples of three radiation emitters 12 which can be used in a lighting system 6 or respectively as a lighting system 6. Specifically, the lighting system 6 has a single light source 34 in the form of a surface emitting white (i.e. the entire color spectrum of visible light). The intensity of the illumination of the light source 34 is homogeneously distributed. A filter 36 with three filter elements 38 is connected in series in front of the light source 34. The emitted white light passes through the filter 36 (shown here as dashed arrows) and strikes an object to be irradiated, such as an intracorporeal tissue, from which it is reflected and falls on the camera 4 for an image A. In particular, each filter element 36 is individually controllable/drivable by the control unit 16 (not shown here), wherein both a degree of transmission of the filter element 36 and thus an intensity (indicated in FIG. 3 by the different thickness of the dashed line), and preferably furthermore even a wavelength range to be transmitted can be set. Thus, the object to be irradiated can be individually illuminated in certain areas and an image A can be further improved. In particular, the object to be illuminated can be divided into three portions in the same way as the three-part filter 36, and the control unit controls the filter elements 36 in such a way that an average (illumination) intensity of the three regions in the image is approximately the same in order to achieve homogeneous illumination and detection by a sensor of the camera 4.

FIG. 4 shows in a flowchart the process steps of an imaging method according to a preferred embodiment of the present disclosure. This imaging method can in particular be used with an imaging system of FIG. 1 or 2.

In a first step S1 of the imaging method for an optimized image of an image region B, the image region B is irradiated with at least a first and a second individually adjustable radiation emitter 12.

In a subsequent step S2, an image A of the region B to be imaged and irradiated is created by a camera system 2 comprising at least one camera 4.

In a step S3, the image is analyzed by an image analysis unit 14 with respect to underexposure and overexposure. For example, the image is divided into individual image portions in the width and height direction (type of pixel of the image), wherein an individual exposure value is determined for each pixel by the image analysis unit 14. Thus, an analysis matrix or table with entries for light intensity is created.

Subsequently, in a step S4, the at least first and second radiation emitters 12 are controlled by a control unit in order to change an irradiation of the first and second radiation emitters 12 in at least the intensity of the radiation and to achieve an optimized image A. Specifically, an intensity is selectively increased or decreased according to the analysis matrix. If the intensity value in the analysis matrix is increased above a standard value, for example 1.4 instead of 1.0, then the intensity is decreased, in particular by the difference between the actual value and the target value. On the other hand, if the intensity value in the analysis matrix is below the standard value, for example 0.7 instead of 1.0, the intensity is increased, in particular by (an absolute amount of) the difference between the target value and the actual value, i.e. by 30%.

In particular, (partial) regions of the image A can be defined in the acquired image A and these regions can be used for the analysis or respectively analysis matrix. In particular, the control unit may be set to specify that these regions of the image should have the same or at least similar (detected) radiation intensity on average (in particular with a deviation of less than 20%, in particular with a maximum deviation of 10%). In particular, the control unit may be adapted to analyze and detect predefined image properties such as objects and/or edges and to use these image properties for the analysis matrix.

With this imaging method, an optimal illumination of image region B is then achieved and a significantly better image A can be created and provided to the surgeon, for example.

The invention claimed is:

1. An imaging system for creating an optimized image of a region to be imaged, the imaging system comprising:

an irradiation system comprising at least a first radiation emitter, a second radiation emitter, and a filter, wherein the first radiation emitter irradiates a first region of the region to be imaged and the second radiation emitter irradiates a second region of the region to be imaged and each of the first and second irradiation emitters are individually adjustable for individual irradiation of the first and second regions of the region to be imaged;

a camera system comprising at least one camera that creates an image of the region to be imaged;

an image analysis unit adapted to analyze the image and digitally provide an analysis result; and a control unit adapted to control the filter based on the analysis result to change an irradiation of the first radiation emitter through the filter and/or the second radiation emitter through the filter to change an intensity of radiation and/or a wavelength of radiation in at least the first region or the second region in order to achieve a homogeneous irradiation having an average illumination intensity that is approximately the same in each of the first and second regions of the image of the region to be imaged, wherein the filter is adapted to controllably selectively lower the intensity of radiation and/or to filter wavelengths output by the first radiation emitter and/or second radiation emitter to achieve the homogeneous irradiation.

2. The imaging system according to claim 1, wherein the filter is adapted to set a different absorption of radiation at at least two different portions through which radiation passes, so that the intensity of radiation is locally selectively adjustable.

3. The imaging system according to claim 1, wherein the at least one camera has a sensor with a matrix-shaped arrangement of semiconductor sensor pixels for radiation measurement.

4. The imaging system according to claim 1, further comprising a prism in order to realize in sections a common beam path of the irradiation system and the camera system.

5. The imaging system according to claim 1, wherein the control unit is adapted to iteratively perform imaging, analyzing, and adapting of irradiation to obtain the homogeneous irradiation for the image and thus the optimized image of the region to be imaged.

6. The imaging system according to claim 1, wherein the camera system comprises at least two sensors having different sensitivities for different wavelength ranges in order to combine a highest possible sensitivity for different wavelength ranges.

7. The imaging system according to claim 1, wherein the camera system comprises a 3D camera to create a 3D image with depth information.

8. The imaging system according to claim 1, wherein the irradiation system is a lighting system.

9. A medical microscope comprising the imaging system according to claim 1.

10. A surgical light, wherein the surgical light comprises the imaging system according to claim 1.

11. A surgical robotic system comprising at least one robot and the imaging system according to claim 1.

12. An imaging method comprising the step of creating an optimized image of a region to be imaged with the imaging system according to claim 1, wherein the imaging system is in a medical microscope, in a surgical light, in a robotic system with robots, or in an endoscope.

13. An imaging method for creating an optimized image of a region to be imaged with the imaging system according to claim 1, the imaging method comprising the steps of:

irradiating the region to be imaged with at least the first radiation emitter and the second radiation emitter;

imaging the irradiated region to be imaged by the camera system;

analyzing an image by the image analysis unit; and controlling filter based on a result of analyzing the image such that an irradiation output by the first radiation emitter and/or the second radiation emitter is changed in an intensity of the radiation and/or in a wavelength of the radiation in order to achieve the optimized image of the region to be imaged, wherein controlling the filter comprises controllably selectively lowering the intensity of radiation and/or filtering wavelengths output by the first radiation emitter and/or second radiation emitter to achieve the homogeneous irradiation.

14. An imaging system for creating an optimized image of a region to be imaged, the imaging system comprising:

an irradiation system comprising at least a first radiation emitter and a second radiation emitter, the first radiation emitter and the second radiation emitter each being individually adjustable for individual irradiation of different regions of the region to be imaged;

a camera system comprising at least one camera that creates an image of the region to be imaged;

an image analysis unit adapted to analyze the image and digitally provide an analysis result;

a control unit adapted to control the irradiation system based on the analysis result and to change an irradiation of the first radiation emitter and/or the second radiation emitter to change an intensity of radiation and/or a wavelength of radiation in order to achieve a homogeneous irradiation having an average illumination intensity that is approximately the same for the different regions of the image of the region to be imaged, and at least one projector, the at least one projector having a grid-shaped or matrix-shaped arrangement of individually controllable radiation emitters that include the first radiation emitter and the second radiation emitter, so that a projected irradiation with individually controllable radiations is provided for the different regions of the region to be imaged, wherein the at least one projector comprises a first projector and a second projector, wherein the first projector emits a first wavelength, and the second projector emits a second wavelength, and wherein the first projector emits wavelengths in at least one of an IR range, a UV range, or an X-ray range, and the second projector emits wavelengths in a visible range in order to provide the user with an adapted illumination of the region to be imaged.

15. The imaging system according to claim 14, wherein the irradiation system is a lighting system and the control unit is adapted to control the lighting system such that a provided picture is projected via the lighting system directly into the region to be imaged in order to act as an augmented reality projector.

16. The imaging system according to claim 14, wherein the camera system comprises at least two sensors having different sensitivities for different wavelength ranges in order to combine a highest possible sensitivity for different wavelength ranges.

17. The imaging system according to claim 14, wherein the camera system comprises a 3D camera to create a 3D image with depth information.

18. The imaging system according to claim 16, wherein one of the two sensors has a sensitivity for wavelengths in the visible range and the other of the two sensors has a sensitivity for wavelengths in at least one of an IR range, a UV range, or an X-ray range.

19. A non-transitory computer-readable medium comprising instructions that, when executed by one or more processors, cause the one or more processors to perform an imaging method for creating an optimized image of a region to be imaged by performing the steps of:

irradiating the region to be imaged with an irradiation system comprising at least a first radiation emitter that irradiates a first region of the region to be imaged, a second radiation emitter that irradiates a second region of the region to be imaged, and a filter;

imaging the irradiated region to be imaged by a camera system;

analyzing an image obtained by the camera system; and controlling the filter based on the analysis of the image obtained by the camera system such that an irradiation of the first radiation emitter through the filter and/or the second radiation emitter through the filter is changed in an intensity of the radiation and/or in a wavelength of the radiation in at least the first region or the second region in order to achieve a homogeneous irradiation having an average illumination intensity that is approximately the same in each of the first and second regions of the image of the region to be imaged, wherein the filter is adapted to controllably selectively lower the intensity of radiation and/or to filter wavelengths in order to achieve the homogeneous irradiation.

20. The medium according to claim 19, wherein the irradiation system comprises a first projector and a second projector having grid-shaped or matrix-shaped arrangements of individually controllable radiation emitters that include the first radiation emitter and the second radiation emitter, the first projector emitting wavelengths in at least one of an IR range, a UV range, or an X-ray range, and the second projector emitting wavelengths in a visible range in order to provide the user with an adapted illumination of the region to be imaged, wherein the instructions further comprise instructions that when executed by the at least one processor perform operations comprising controlling at least one of the first projector or the second projector to irradiate the region to be imaged by projecting irradiation with individually controllable radiations for different regions of the region to be imaged.

* * * * *